United States Patent [19]

Padamsee

[11] Patent Number: 5,329,778
[45] Date of Patent: Jul. 19, 1994

[54] THERMALLY INSULATED BOTTLE AND METHOD OF ASSEMBLY THEREOF

[76] Inventor: Riaz A. Padamsee, 214 Lakeshore Dr., Durham, N.C. 27713

[21] Appl. No.: 82,539

[22] Filed: Jun. 28, 1993

Related U.S. Application Data

[62] Division of Ser. No. 919,231, Jul. 27, 1992, Pat. No. 5,243,835.

[51] Int. Cl.$^5$ ............................................... F25D 3/00
[52] U.S. Cl. ............................................ 62/56; 62/530; 62/457.2; 220/444; 215/13.1
[58] Field of Search ............... 62/457.1, 457.2, 457.3, 62/457.8, 372, 529, 530; 215/13.1; 220/421, 428, 444, 468; 240/46.5, 46.9; 425/819

[56] References Cited

U.S. PATENT DOCUMENTS

| | | | |
|---|---|---|---|
| 2,039,736 | 5/1936 | Munters et al. | 62/457.4 |
| 2,315,425 | 3/1943 | Hill et al. | 62/530 |
| 2,526,165 | 10/1950 | Smith | 62/1 |
| 2,622,415 | 12/1952 | Landers et al. | 62/142 |
| 2,926,508 | 3/1960 | Moon | 62/457 |
| 3,161,031 | 12/1964 | Flannery | 62/457 |
| 3,269,144 | 8/1966 | Poris | 62/457 |
| 3,302,427 | 2/1967 | Stoner et al. | 62/457 |
| 3,302,428 | 2/1967 | Stoner et al. | 62/457 |
| 3,715,895 | 2/1973 | Devlin | 62/457 |
| 3,766,975 | 10/1973 | Todd | 165/74 |
| 3,807,194 | 4/1974 | Bond | 62/457 |
| 4,183,226 | 1/1980 | Moore | 62/457 |
| 4,296,799 | 10/1981 | Steele | 220/444 |
| 4,299,100 | 11/1981 | Crisman et al. | 62/457 |
| 4,324,111 | 4/1982 | Edwards | 62/457 |
| 4,344,303 | 8/1982 | Kelly, Jr. | 62/530 |
| 4,357,809 | 11/1982 | Held et al. | 62/457 |
| 4,393,975 | 7/1983 | Moore | 62/457.2 |
| 4,399,668 | 8/1983 | Williamson | 62/457 |
| 4,625,518 | 12/1986 | Freedman | 62/1 |
| 4,723,974 | 2/1988 | Ammerman | 62/4 |
| 4,741,176 | 5/1988 | Johnson et al. | 62/457 |
| 4,782,670 | 11/1988 | Long et al. | 62/457 |
| 4,831,842 | 5/1989 | Kelley et al. | 62/457.4 |
| 4,882,914 | 11/1989 | Haines-Kelley et al. | 62/457.4 |
| 4,932,225 | 6/1990 | Bighouse | 62/372 |
| 4,986,089 | 1/1991 | Raab | 62/457.1 |
| 5,001,907 | 3/1991 | LaCroix et al. | 62/457.4 |
| 5,044,173 | 9/1991 | Cheng | 62/372 |
| 5,110,085 | 5/1992 | Iwasawa | 425/812 |

Primary Examiner—John M. Sollecito
Attorney, Agent, or Firm—Renner, Kenner, Grieve, Bobak, Taylor & Weber

[57] ABSTRACT

A thermal insulated bottle (10) includes an outer container (12) having an open end (16) and an inner cup (18) which is at least partially received and spaced apart from the outer container (12). The inner cup (18) and outer container (12) engage each other, preferably by a shoulder (24) at the open end (16) of the outer container (12) which encloses the space between the inner cup (18) and the outer container (12) to form a chamber (26). Within the chamber (26), a sleeve (28) of freezable fluid (30) is positioned around the inner cup (18). A thermal insulating material (32) occupies the rest of the chamber (26) between the sleeve (28) and the outer container (12).

5 Claims, 4 Drawing Sheets

THERMALLY INSULATED BOTTLE AND METHOD OF ASSEMBLY THEREOF

This application is a division of application Ser. No. 07/919,231, filed Jul. 27, 1992 now U.S. Pat. No. 5,243,835.

TECHNICAL FIELD

This invention relates to a thermally insulated bottle. More particularly, the invention relates to a virtually unbreakable, thermally insulated bottle which may be used to store and chill fluids. Specifically, the invention relates to an integrally constructed, double-walled bottle having an annular space between inner and outer walls. A sleeve of refreezable material is positioned in the annular space in contact with and around the inner wall for chilling fluids, and a layer of rigid thermal insulation is foamed in place in the annular space to fill the same and create the integral construction.

BACKGROUND ART

It is generally desirable to store beverages such as soft drinks and the like in a refrigerated area so that, when ready to be consumed, the beverages are in a chilled state. For this reason, storage containers such as refrigerators, ice boxes, ice chests and various beverage container holders have evolved. However, these storage containers require that the beverage be stored in a can or bottle, the refrigerated containers being adapted to chill both the beverage and the can or bottle.

In order to carry and store just the beverage, thermally insulated bottles, such as the thermos vacuum bottle, were introduced. These thermally insulated bottles generally include a vacuum flask made from glass or steel placed within an outer container. The vacuum flask may also be surrounded by an insulating material to further retain the temperature of the fluid within the flask. Although the vacuum flasks of the conventional insulated bottles maintain the temperature of the fluid therein very well, they are not adapted to chill the fluids contained therein. Furthermore, the glass form of the bottle is susceptible to being broken. On the other hand, while the steel form of the vacuum bottle is unbreakable, it is very expensive to manufacture.

Consequently, the polyurethane insulated plastic bottle was developed. This bottle is both unbreakable and inexpensive to manufacture. Yet, because the plastic bottle does not exhibit superior temperature retention properties, it has not completely replaced the vacuum bottle. Moreover, the polyurethane insulated plastic bottle, like the vacuum bottle, only attempts to maintain the temperature of the fluids contained therein rather than to actually chill the same.

As a result, several products have been developed which will chill the fluids as well as maintain the chilled condition thereof. For example, U.S. Pat. No. 4,882,914 is directed toward a beverage cooler which is formed of sponge rubber and adapted to hold and cool a beverage container. In order to cool the beverage, a plurality of polyethylene receptacles filled with gel refrigerant are spaced around the side wall of the container and encapsulated therein. However, this device must always be used with a container to store the fluids to be cooled, and while it is expandable for the reception of the beverage container, it does not provide for the expansion of the gel refrigerant within the receptacles.

Similarly, U.S. Pat. No. 4,183,226 provides a device for chilling and maintaining the chilled condition of a fluid by including a sleeve of gel refrigerant disposed within the insulated beverage can holder. The sleeve acts as the inside wall of the beverage can holder and contacts the separable container in which the fluid is stored.

The need therefore exists for an inexpensive, unbreakable, thermally insulated bottle of unitary construction which can be used to carry and store fluids and chill them for consumption purposes.

DISCLOSURE OF THE INVENTION

It is therefore a primary object of the present invention to provide an unbreakable, thermally insulated bottle which permits superior temperature retention properties of a fluid contained therein.

It is another object of the present invention to provide a thermally insulated bottle, as above, which is relatively inexpensive to manufacture.

It is yet another object of the present invention to provide a thermally insulated bottle, as above, which is adapted for intensively chilling and maintaining the chilled condition of the fluid therein before and during consumption.

It is an additional object of the present invention to provide a thermally insulated bottle, as above, which combines a sleeve of refreezable material and polyurethane foam to create and maintain the chilled condition of the fluid.

It is a further object of the present invention to provide a method for manufacturing an inexpensive, unbreakable, thermally insulated bottle which may be used to store and carry fluids.

These and other objects of the present invention, as well as the advantages thereof over existing prior art forms, which shall become apparent from the description which follows, are accomplished by the means hereinafter described and claimed.

In general, the present invention provides an apparatus for storing and chilling a fluid which includes an outer container open at one end and an inner cup open at one end for receiving the fluid. The inner cup is at least partially received by and spaced apart from the outer container, and means are provided to close the space between the inner cup and the outer container to form a chamber. A sleeve is positioned around the inner cup within the chamber and carries a freezable fluid. A thermal insulating material is disposed between the outer container and the sleeve within the chamber.

The fluid chilling apparatus is assembled by filling the sleeve with the freezable liquid and then positioning the sleeve over the outside of the inner cup. The inner cup is then positioned at least partially within the outer container forming a chamber therebetween. A thermal insulating material is placed in the chamber and foamed and cured therein.

A preferred thermally insulated bottle incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 2:
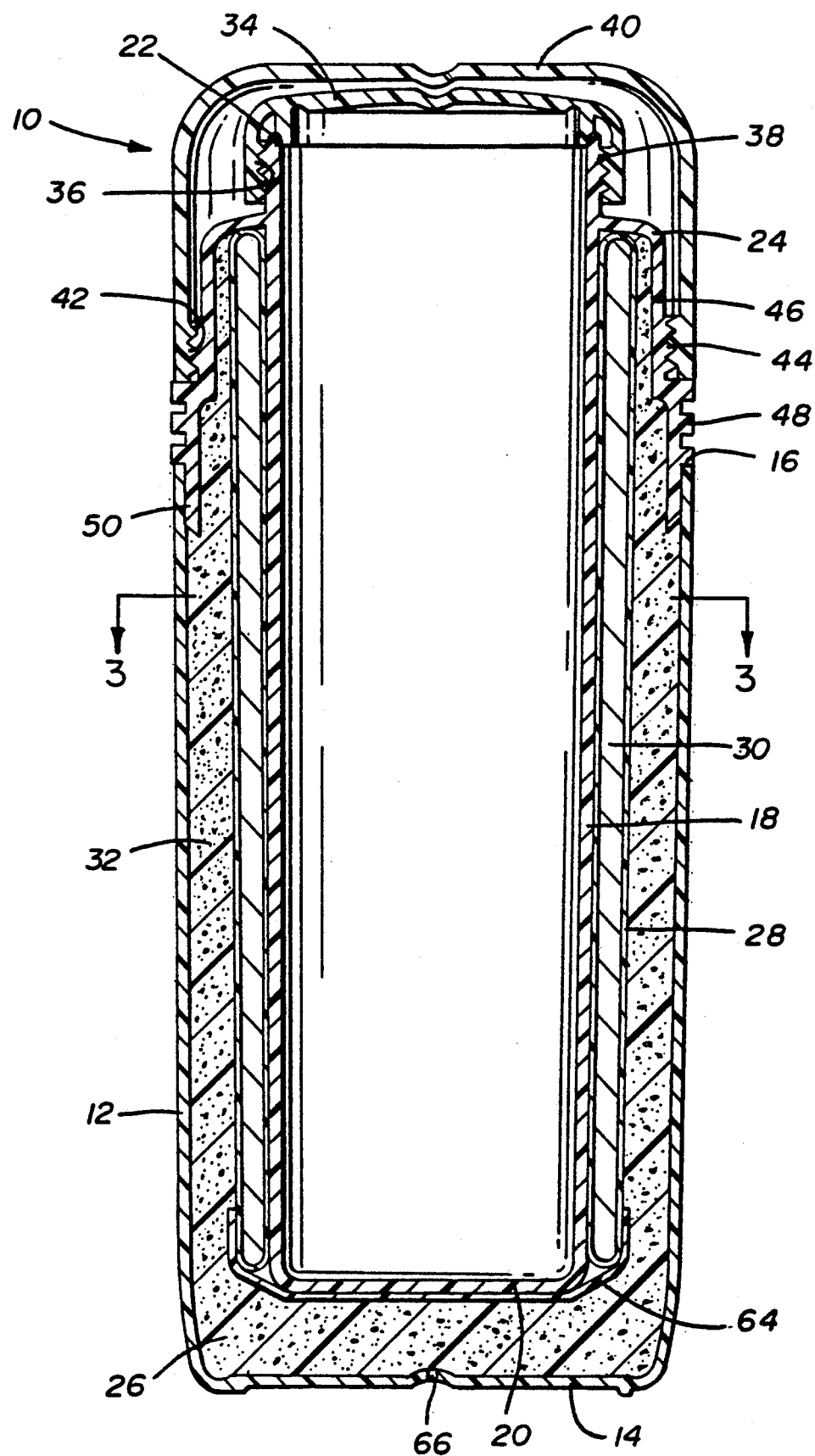
FIG. 2 is a sectional view of the bottle taken substantially along line 2—2 of FIG. 1.

One representative form of a thermally insulated bottle according to the concepts of the present invention is generally indicated by the numeral 10, and as best shown in FIG. 2, includes an outer container 12 having a closed bottom 14 and an open upper end 16. An inner cup 18 having a closed lower end 20 and an open upper end 22 is at least partially received by and spaced apart from outer container 12. A shoulder 24 extends outwardly from inner cup 18 near its open upper end 22 to enclose and form a chamber 26 between inner cup 18 and outer container 12.

A sleeve 28 having a freezable fluid 30 encased therein is positioned around inner cup 18 within chamber 26. Sleeve 28 is preferably made from a stretchable polymer fabric so as to allow for expansion of freezable fluid 30 when it solidifies. A thermal insulating material 32, such as polyurethane foam, is also disposed within chamber 26 and occupies the rest of the space in chamber 26 between sleeve 28 and outer container 12.

Preferably, an inner cap 34 may be employed to close open upper end 22 of inner cup 18. Cap 34 can be fitted onto inner cup 18 by any means known in the art, but it is preferable that cap 34 have inwardly directed threads 36 which cooperate with complementary external threads 38 located around the periphery of open end 22 of inner cup 18.

Figure 1:
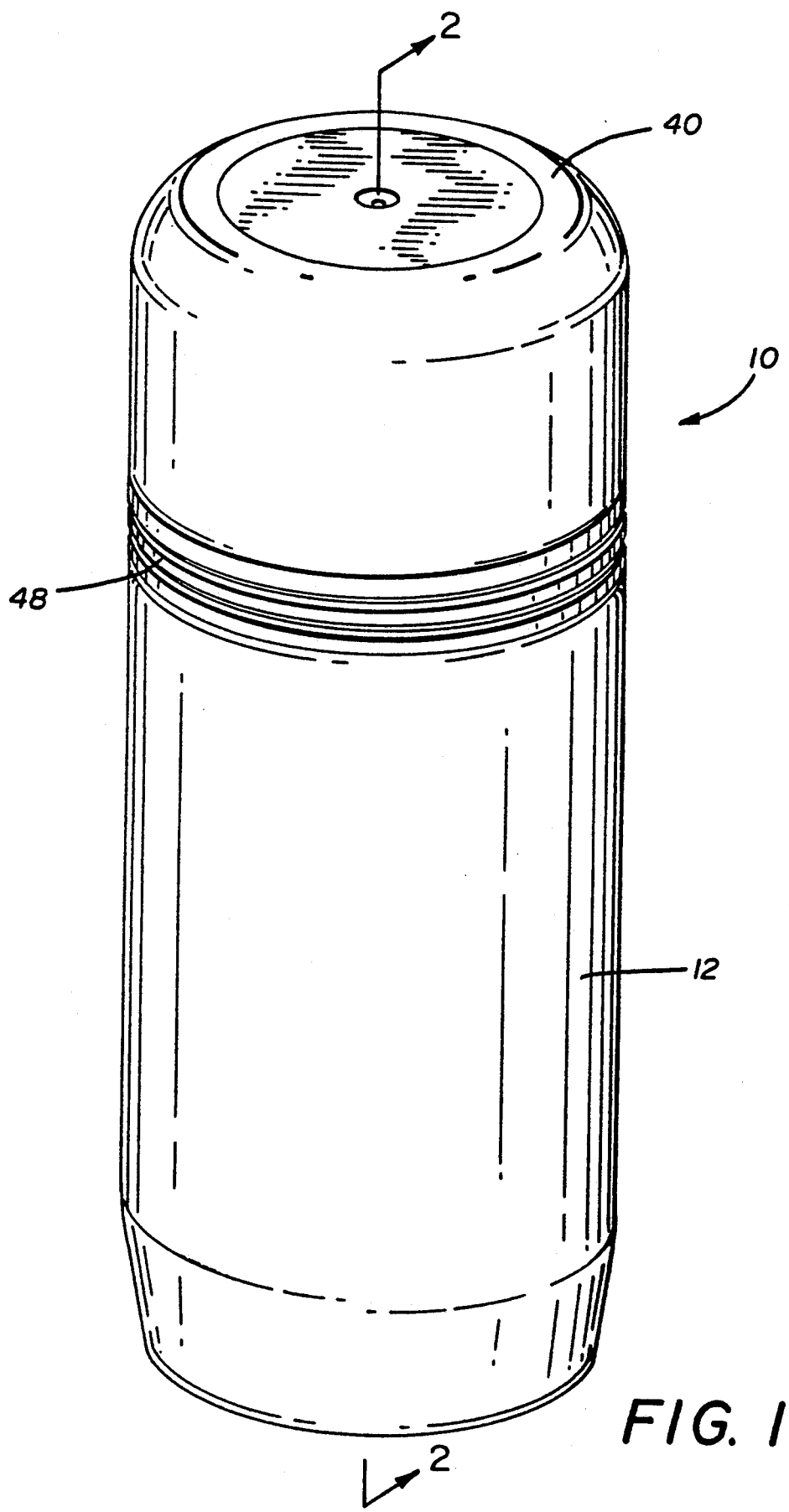
FIG. 1 is a perspective view of a thermally insulated bottle according to the concepts of the present invention.

A larger, outer cap 40 is also preferably used to close open upper end 16 of outer container 12 and thereby enclose the inner cup 18. While cap 40 may function by engaging outer container 12 itself, it is preferable that cap 40 engage shoulder 24 as shown in FIGS. 1 and 2. Like cap 34 of inner cup 18, cap 40 can be received onto shoulder 24 by any means known in the art. In the embodiment shown in FIG. 2, cap 40 has inwardly directed threads 42 that cooperate with complementary external threads 44 located on a downwardly extending portion 46 of shoulder 24.

Still referring to FIG. 2, shoulder 24 also includes an extension 48 which separates outer container 12 from cap 40, extension 48 being the only portion associated with inner cup 18 which is not enclosed by outer container 12 and cap 40 in the preferred embodiment. Furthermore, a snap piece 50 extends downwardly from extension 48 to attach shoulder 24 to outer container 12.

Figure 3:
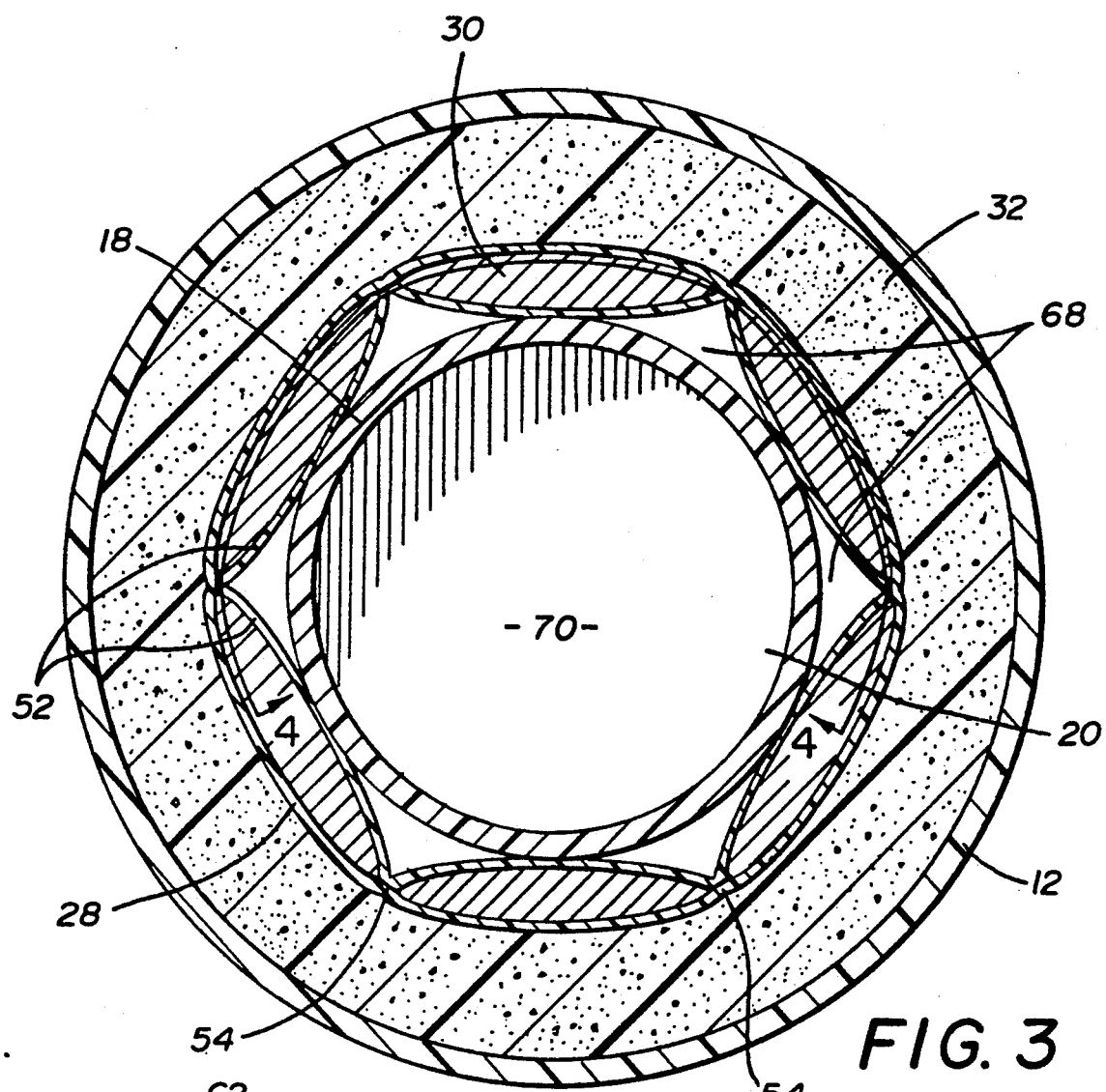
FIG. 3 is a sectional view of the bottle taken substantially along line 3—3 of FIG. 2.
Figure 4:
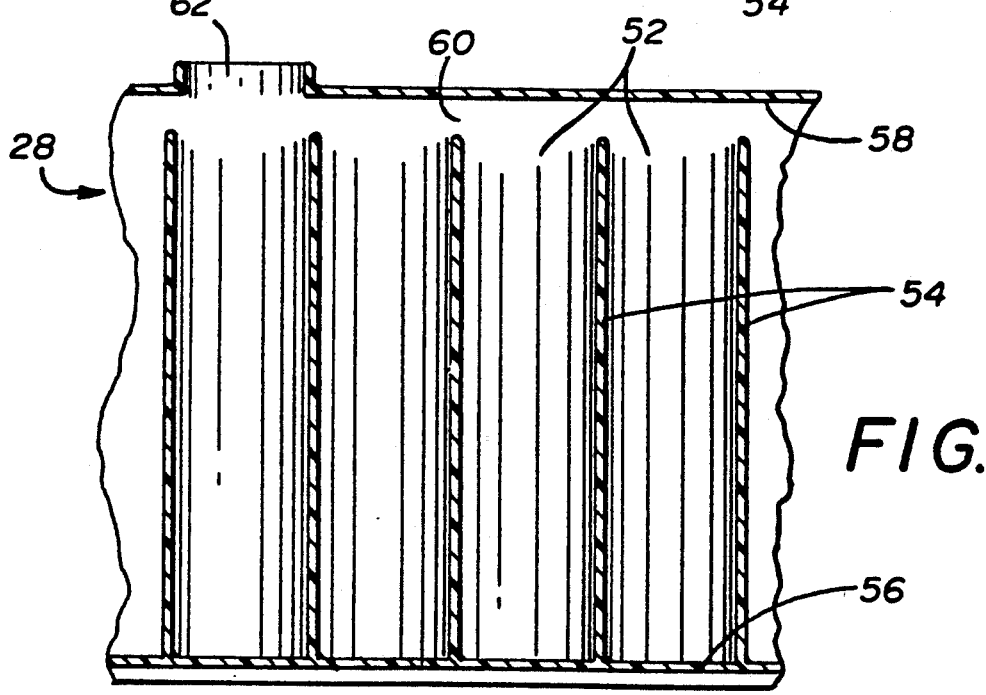
FIG. 4 is an arcuate fragmentary sectional view taken substantially along line 4—4 of FIG. 3.

As shown in FIGS. 3 and 4, sleeve 28 includes a plurality of sachets or pockets 52 defined by a plurality of parallel seams 54 which intersect an edge seam 56 and extend short of an opposite edge seam 58. As such, a manifold-type filling passage 60 is formed to connect the plurality of sachets 52 which are filled with freezable fluid 30 poured into sleeve 28 through filler port 62.

The seams are heat sealed together as is commonly known in the art.

Figure 5:
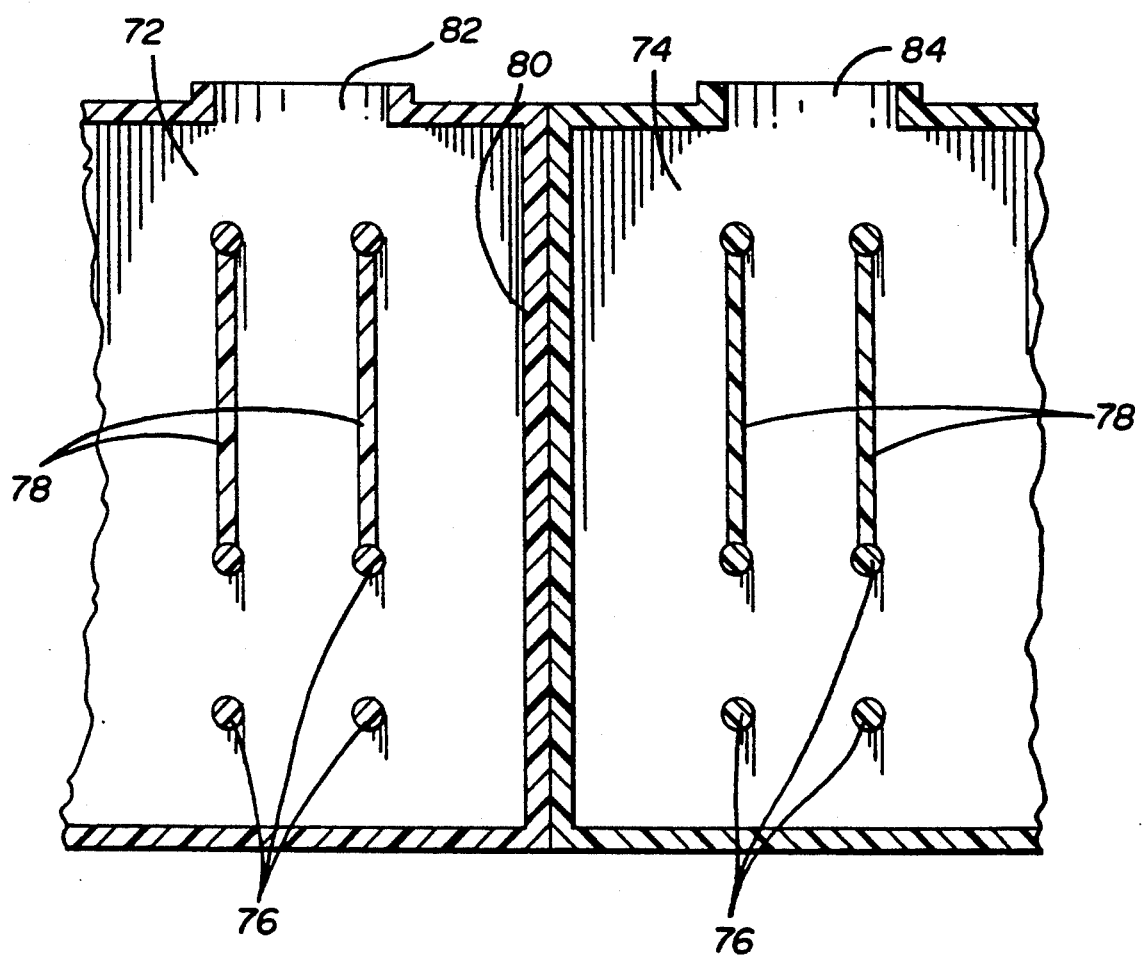
FIG. 5 is an alternative embodiment of the arcuate fragmentary sectional view taken substantially along line 4—4 of FIG. 3.

Alternatively, as shown in FIG. 5, sleeve 28 may be fabricated from two separate pouches 72 and 74. Each pouch 72, 74 is tacked in a manner so as to generally define sachets similar to those described hereinabove. Specifically, pouches 72 and 74 are tacked at a plurality of predefined points 76 along the general linear axis of the edges of each sachet. In the embodiment of FIG. 5, there are six points 76, three along each edge. A linear seam 78 is then formed preferably between the upper two points 76 of the edges of the sachet so as to more precisely define each sachet. Notably, the bottom portion of pouches 72 and 74 remains open. After each pouch 72, 74 is formed, sleeve 28 is formed by heat sealing the edge seams of pouches 72, 74 together. Pouches 72 and 74 may then be filled with freezable, fluid 30 which is poured through filler ports 82 and 84, respectively.

Any freezable fluid commonly known in the art can be employed in the present invention without departing from the scope thereof. Preferably, a water-based freezable gel solution such as BLUE ICE is used. BLUE ICE is a trademark of Rubbermaid Incorporated of Wooster, Ohio, and is commercially known as a nontoxic refreezable gel solution which is often used to replace ice in coolers and ice chests.

Assembly of bottle 10 begins by pouring freezable fluid 30 into sleeve 28. For the embodiment shown in FIG. 4, freezable fluid 30 first fills the sachet 52 proximate to filler 62 until it is full. It will be appreciated that upon filling the first sachet, freezable fluid will then pass through filling passage 60 and into the sachet 52 adjacent to the first. Then, once those sachets are filled, freezable fluid 30 will pass through filling passage 60 again and successively into each of the empty sachets 52 until all of the sachets 52 have been filled with freezable fluid 30. Filler port 62 is sealed by any means known in the art to make edge seam 58 continuous similar to edge seam 56.

In the alternative embodiment of FIG. 5, freezable fluid 30 fills pouches 72 and 74 of sleeve 28 through filler ports 82 and 84 respectively. It will be appreciated that although pouches 72 and 74 may be filled at different rates and times, each pouch fills each sachet simultaneously because of the open bottom portion of each sachet. Filler ports 82 and 84 may be sealed by any means known in the art as described hereinabove for filler port 62.

Sleeve 28 can then be slidably received onto and positioned around inner cup 18. Inasmuch as inner cup 18 may already include shoulder 24, it will be appreciated that sleeve 28 may be slid over inner cup 18 from its closed end 20. However, it should be understood that sleeve 28 could be slidably received onto inner cup 18 from open end 22 in embodiments where shoulder 24 is not integrally formed as part of inner cup 18.

Sleeve 28 may be retained around inner cup 18 by any method commonly used in the art. One method is to provide inner cup 18 with a tapered configuration so that it is wider at its open end 22 than at its closed end 20. Alternatively, sleeve 28 may be positioned against shoulder 24 at open end 22 of inner cup 18 and adhered at the lower end thereof as by utilizing, for example, an adhesive tape 64 (FIG. 2).

Thermal insulating material 32, such as uncured "foamed-in-place" polyurethane, can then be poured in outer container 12. Inner cup 18 with sleeve 28 positioned therearound can then be placed into outer container 12 such that snap piece 50 is secured to open end 16 of outer container 12 to enclose the space between inner cup 18 and outer container 12 to form chamber 26. Alternatively, cup 18 may be inverted and thermal insulating material 32 may be poured into the cavity formed between inner cup 18 and downwardly extending portion 46 of shoulder 24. In either instance, thermal insulating material 32 will be allowed to expand and cure after inner cup 18 and outer container 12 are engaged at shoulder 24. There should be an amount of insulating material sufficient to fill the entire chamber 26 between outer container 12 and sleeve 28 upon expansion and curing. Any excess insulating material 32 may be released through a vent hole 66 in base 14 of outer container 12. Upon proper curing of the insulating material, vent hole 66 may be plugged as is commonly known in the art.

With reference to FIG. 3, it is noted that, when positioned around inner cup 18, a plurality of axially extending air spaces 68 are formed between sleeve 28 and inner cup 18. Specifically, air spaces 68 are formed at the location of seams 54 of sleeve 28. These axially extending air spaces 68 remain during and after the foaming and curing of thermal insulating material 32. Thus, when bottle 10 is placed in a refrigerated area so as to permit freezable fluid 30 to solidify, expansion of sleeve 28 in accordance therewith is afforded by the compression of air spaces 68 thereby positioning the frozen fluid 30 in close proximity to the entire periphery of cup 18 and the fluid it may carry.

Thus, the present invention is unique in that bottle 10 is a double-wall unitary structure having spaced inner and outer walls defined by inner cup 18 and outer container 12, respectively. Thermal insulating material 32 and an expandable pouch, such as sleeve 28, having freezable fluid 30 encased therein generally occupy the space between the two walls. Thermal insulating material 32 may be in contact with the outer wall and sleeve 28 contacts the inner wall in a manner such that at least one air space 68 is formed. The air space 68 is compressed when the freezable fluid solidifies and expands the pouch or sleeve 28.

It should therefore be evident that the resultant bottle 10 can chill the contents retained therein as well as maintain the chilled conditions thereof. Bottle 10 has been adapted to be placed in a refrigerated area, preferably without caps 34 and 40 in place, so that the freezable fluid within sleeve 28 can be solidified. Once freezable fluid 30 is frozen, any beverage or other fluid may be poured into an inner chamber 70 defined by inner cup 18 to be maintained chilled until consumption. The freezable fluid acts similar to and may take the place of ice, but is not deposited within the beverage or other fluid to be chilled. Thus, the contents in bottle 10 are not diluted or contaminated. Furthermore, sleeve 28 is surrounded by thermal insulating material 32 so as to prevent condensation on the outside of bottle 10.

Thus it should be evident that the bottle of the present invention is highly effective in storing, chilling and maintaining the chilled conditions of fluids retained therein. The invention is particularly suited for storing and chilling beverages, but is not necessarily limited thereto.

Moreover, it should also be appreciated that bottle 10 may be constructed from any material known in the art. Preferably, outer container 12, inner cup 18 and shoulder 24 are all made from a thermoplastic material. However, other materials known in the art may be employed without departing from the spirit of the present invention.

Based upon the foregoing disclosure, it should now be apparent that the bottle described herein will accomplish the objects set forth hereinabove and otherwise constitutes an advantageous contribution to the art. Thus, the scope of the invention shall include all modifications and variations that may fall within the scope of the attached claims.

I claim:

1. A method for assembling a bottle for containing a fluid comprising the steps of forming a sleeve with at least one edge seam and a plurality of seams extending short of the edge seam, filling the sleeve with a freezable fluid, positioning the sleeve around an inner cup, forming a chamber between the inner cup and an outer container by positioning the inner cup within the outer container, and filling the chamber with a thermal insulating material by permitting the material to foam and cure therein.

2. A method according to claim 1, further comprising the step of closing the top of the inner cup and the outer container.

3. A method according to claim 1, further comprising the step of retaining the sleeve on the inner cup.

4. A method according to claim 1, further comprising the steps of providing a vent hole through the outer container to release any excess thermal insulating material during said step of filling the chamber, and thereafter plugging the vent hole.

5. A method for assembling a bottle for containing a fluid comprising the steps of filling a sleeve having a plurality of sachets with freezable fluid by filling a first sachet within the sleeve with the freezable fluid until full, and then continuing to fill the sleeve such that the freezable fluid overflows the first sachet, passing through a fill passage in the sleeve and into adjacent sachets until all of the sachets have been filled with a predetermined amount of freezable fluid, positioning the sleeve around an inner cup, forming a chamber between the inner cup and an outer container by positioning the inner cup within the outer container, and filling the chamber with a thermal insulating material by permitting the material to foam and cure therein.

* * * * *